United States Patent [19]
Youngers

[11] Patent Number: 5,741,151
[45] Date of Patent: Apr. 21, 1998

[54] ELECTRICAL CONNECTOR CONTACT ENABLING DETECTION OF THE PRESENCE OF A MATING CONNECTOR CONTACT

[75] Inventor: Kevin J. Youngers, Greeley, Colo.

[73] Assignee: Hewlett-Packard Company, Palo Alto, Calif.

[21] Appl. No.: 549,364

[22] Filed: Oct. 27, 1995

[51] Int. Cl.$^6$ .................................................. H01R 3/00
[52] U.S. Cl. ........................................ 439/489; 439/188
[58] Field of Search ............................. 439/188, 488, 439/489, 490, 502, 504, 952

[56] References Cited

U.S. PATENT DOCUMENTS

| | | | |
|---|---|---|---|
| 4,468,612 | 8/1984 | Starr | 439/955 X |
| 4,915,648 | 4/1990 | Takase et al. | 439/490 |
| 5,201,853 | 4/1993 | Alwine | 439/490 X |
| 5,313,595 | 5/1994 | Lewis et al. | 395/325 |
| 5,434,516 | 7/1995 | Kosco | 326/30 |
| 5,562,607 | 10/1996 | Gyory | 439/188 X |

*Primary Examiner*—Khiem Nguyen
*Attorney, Agent, or Firm*—Augustus W. Winfield

[57] ABSTRACT

An electrical connector having a female contact that enables detection of the presence of a corresponding male contact. The female contact is divided into two parts. The two parts are electrically isolated. When a male pin is installed in the female contact, the male pin electrically connects the two parts of the female contact together. In a specific application, the female contact is in a connector for an external device on a SCSI computer bus. The first part is pulled high and serves as a sense line. The second part is pulled to ground. A pin in the mating connector electrically connects the two parts of the female contact, pulling the sense line to ground. The external device disables internal termination of the SCSI bus when the sense line is pulled low. In an alternative embodiment, the external device has two SCSI connectors, each with a two-part female contact. The external device in the alternative embodiment disables internal termination of the SCSI bus when both of the SCSI connectors have mating connectors installed.

10 Claims, 5 Drawing Sheets

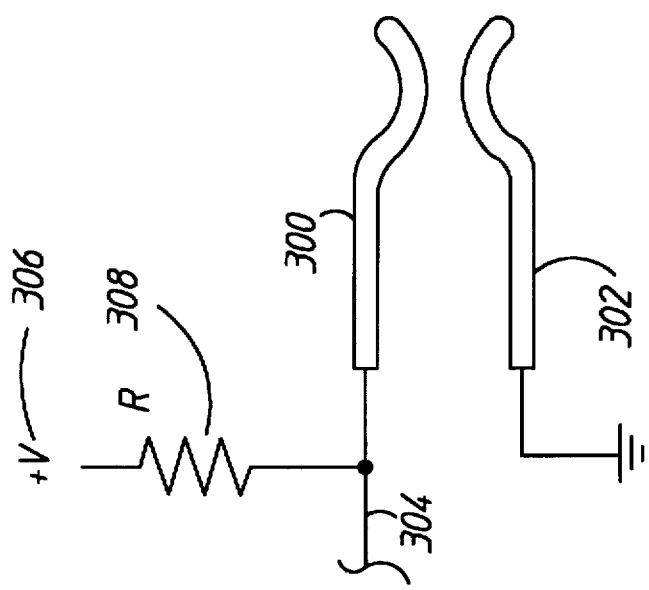

ELECTRICAL CONNECTOR CONTACT ENABLING DETECTION OF THE PRESENCE OF A MATING CONNECTOR CONTACT

FIELD OF INVENTION

This invention relates generally to electrical connectors, particularly for computer input/output cables and more specifically to automatic detection of the presence of a mating connector.

BACKGROUND OF THE INVENTION

In electronic systems, there is often a need to automatically detect if a cable or connector is attached. For example, a common problem is automatic detection of whether a device is at the end of a transmission line in order to properly provide a termination impedance for the transmission line.

For a particular example, a commonly used parallel input/output (I/O) system for computers, the Small Computer System Interface (SCSI), requires termination at each end (and only at each end) in a chain of devices. Although ANSI standards documents exist for SCSI, there have been proprietary variations and there has been an evolution of proposed extensions or improvements. SCSI signal lines may be single ended or differential. There are a variety of connectors being used. Finally, external devices claiming to conform to SCSI requirements have implemented a variety of termination alternatives as follows: passive termination internal to the device (typically socketed or jumpered for removability), active termination internal to the device, manually switchable or automatically switchable internal termination (active or passive), and external termination requiting an additional external connector with termination circuitry plugged into the extra external connector.

The variety of connector and termination schemes has led to customer confusion and the possibility of excessive termination within a chain of devices. In particular, a customer typically cannot determine externally whether a particular device has an internal termination and whether any internal termination is socketed, jumpered, or switched (passive or active). If a terminator is missing, or if a terminator is enabled when it should not be enabled, the SCSI bus may not function reliably.

One recent proposal, called Plug and Play SCSI, attempts to simplify the connector and termination problems by specifying one standard connector for external devices and by specifying that termination for external devices must be external to the devices. In particular, active external termination is required, with terminator power provided by a specific line in the SCSI bus. Each external device must have two-visible external connectors. When external devices are chained together, only one connector can remain open and that one open connector must receive the one external active termination circuit. However, this still requires manual intervention, requires a separate additional-cost part, and creates a risk of performance loss if the part is lost. It requires a customer to purchase a separate terminator plug (active circuitry plus a connector) and to properly install that terminator plug on the one open external device connector. A more cost effective and foolproof system would result if the last device in a chain could sense when nothing is plugged into one of its two external connectors and to automatically switch in an internal active termination circuit if nothing is plugged into one of its external connectors.

One approach to automatic detection of the presence of an external connector is to take a Pine that is normally grounded by every device on the bus and for a particular external device, internally pull that line high instead of low (For example, see U.S. Pat. No. 5,434,516 to Kosco and U.S. Pat. No. 5,313,595 to Lewis et al). If the line is at ground, some external device must be connected. If the line is high, an external device is probably not connected. The word "probably" is used because the method of removing a ground from a line and determining that no external is connected if the line is pulled high assumes that not all devices on the bus use the same method. That is, the method assumes that at least one device on the bus pulls the sensed line low. If the method is standard so that every device on the bus uses the same method, then no device will pull the sensed line low. For SCSI systems, there is still a need for automatic sensing that can be standard for all devices. There is still a general need beyond SCSI systems for automatic detection of the presence of a mating connector.

SUMMARY OF THE INVENTION

A modified female connector enables a device to detect whether a male cable connector is attached. In a typical female connector, a single female contact makes electrical contact with at least two sides of a corresponding male connector pin. Typically, all parts of the female contact are electrically connected. In the modified female connector of the invention, two parts of a female contact are not electrically connected unless the corresponding male connector pin is present. In a specific embodiment with application to SCSI bus systems, the female contact is specified as a ground connection. One part of the female contact is grounded and another part is pulled high. The part that is pulled high is used as a sensing line. If no male connector is installed, the sense line is high. When a male connector is installed, a male contact shorts the parts of the female contact together, pulling the sense line and the male connector pin to the internal ground potential. The resulting connector provides sensing whether used in a single device or all devices. The contact also provides the specified ground connection while functioning as a sensing contact.

BRIEF DESCRIPTION OF THE DRAWINGS

FIG. 3A is a cut-away view of a female connector contact in accordance with the invention, along with a simplified schematic of the sensing electronics.

DETAILED DESCRIPTION OF THE PREFERRED EMBODIMENT OF THE INVENTION

In the following discussion, a SCSI bus system will be used for illustration of an application of a connector contact. It should be understood that the contact may be used in general for detection of the presence of a mating connector and is not limited to just SCSI bus systems.

Figure 1:
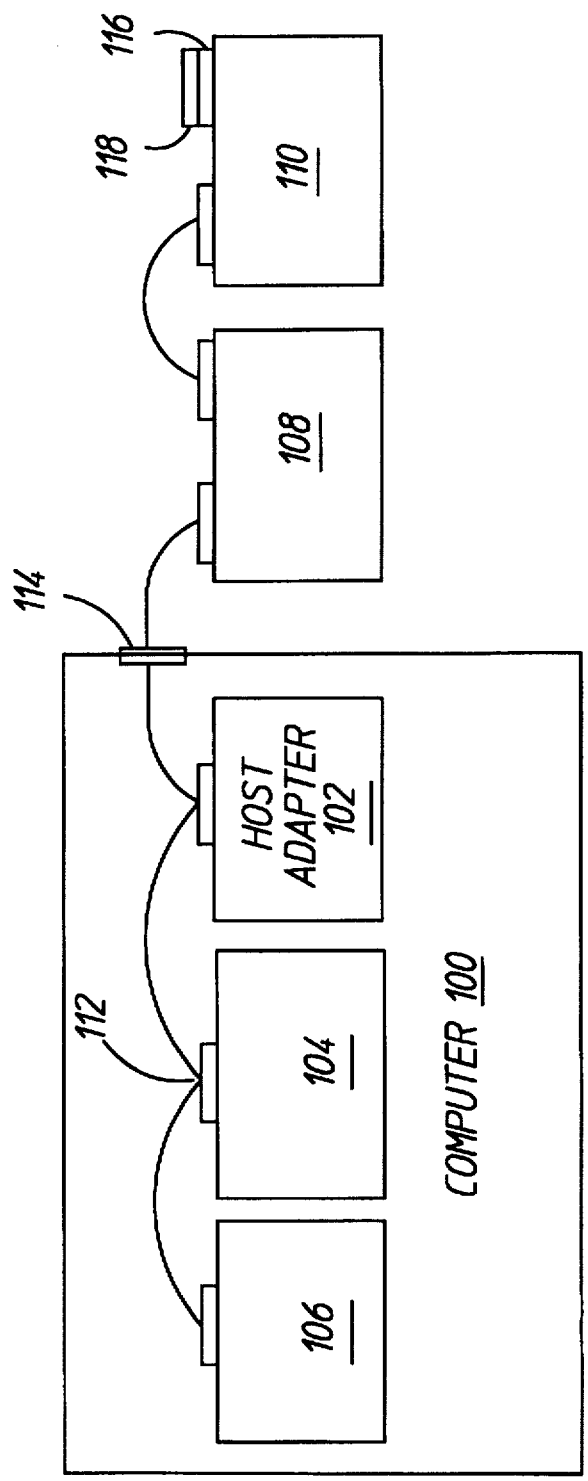
FIG. 1 is a block diagram schematic of a computer system with a SCSI bus system.

FIG. 1 illustrates a computer system and various peripheral devices interconnected by a SCSI I/O bus system. A computer 100 includes a SCSI host adapter 102 and two internal devices (104 and 106). The internal devices might be, for example, a disk drive and a backup tape drive. Two external devices (108 and 110) are also connected to the SCSI bus. The external devices might be, for example, a printer and a scanner. In general, the SCSI bus system may have more or fewer devices. In the SCSI system illustrated in FIG. 1, internal device 106 must provide a bus termination impedance. Internal devices 104 and 106 are typically connected by a ribbon cable with a single connector (for example, 112) for each device. The external devices are connected by a series of double ended cables. The first cable connects connector 114 on the computer 100 to external device 108. A second cable connects external device 108 to external device 110. External device 110 has an open connector 116 (no cable attached) that may be terminated with a terminator plug 118 (mandatory for Plug and Play SCSI) or may be terminated internally to device 110.

Figure 2:
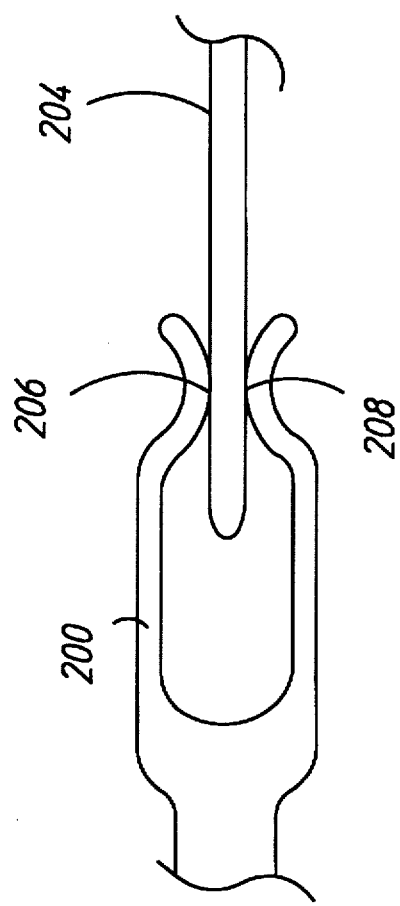
FIG. 2 (Prior Art) is a cut-away view of a typical female connector contact and a corresponding male connector pin.

FIG. 2 illustrates a single female contact as commonly used in connectors, for example, one of the connectors attached to one of the external devices in FIG. 1 such as connector 116 on external device 110. Female contact 200 makes contact with a corresponding male pin 204 at points 206 and 208. Points 206 and 208 are electrically connected through contact 200 whether or not pin 204 is present.

FIG. 3A illustrates a female contact as in the invention. The female contact in FIG. 3A has been separated into two electrically isolated parts. The parts are electrically connected only if an corresponding pin is installed. For a specific embodiment with application to SCSI busses, part 300 is connected to a sense line 304. Sense line 304 is pulled to a voltage 306 by a resistor 308. The sense line could just as easily be actively pulled high with a transistor. Part 302 is connected to a ground potential. With no male pin installed, the sense line 304 is pulled high.

Figure 3B:
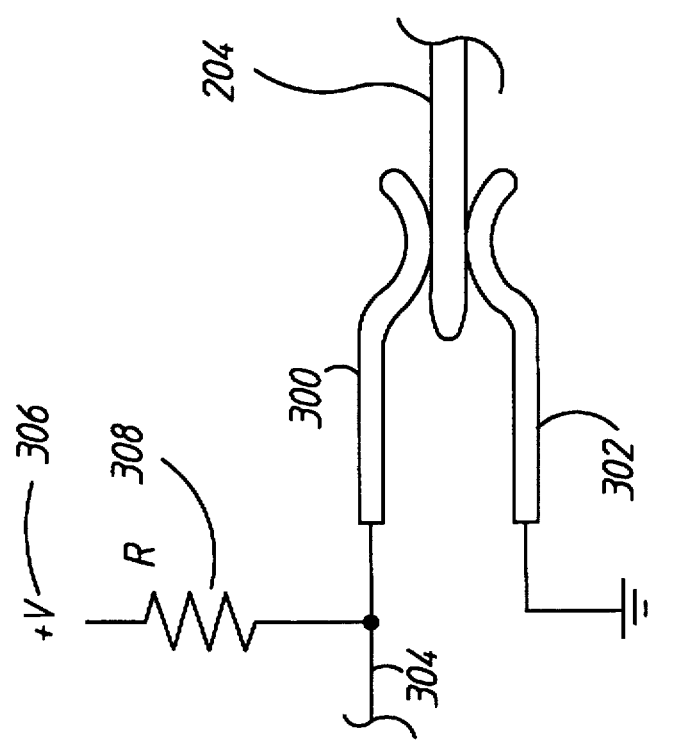
FIG. 3B is a cut-away view of the female connector contact of FIG. 3A with a male connector pin installed.

FIG. 3B is the two part female contact of FIG. 3A with a male pin 204 installed. With male pin 204 installed, the sense line 304 is pulled low through the male pin 204 to part 302 of the female contact to the ground potential. Note that pin 204 is also connected to ground, as required by the SCSI specification.

Figure 4:
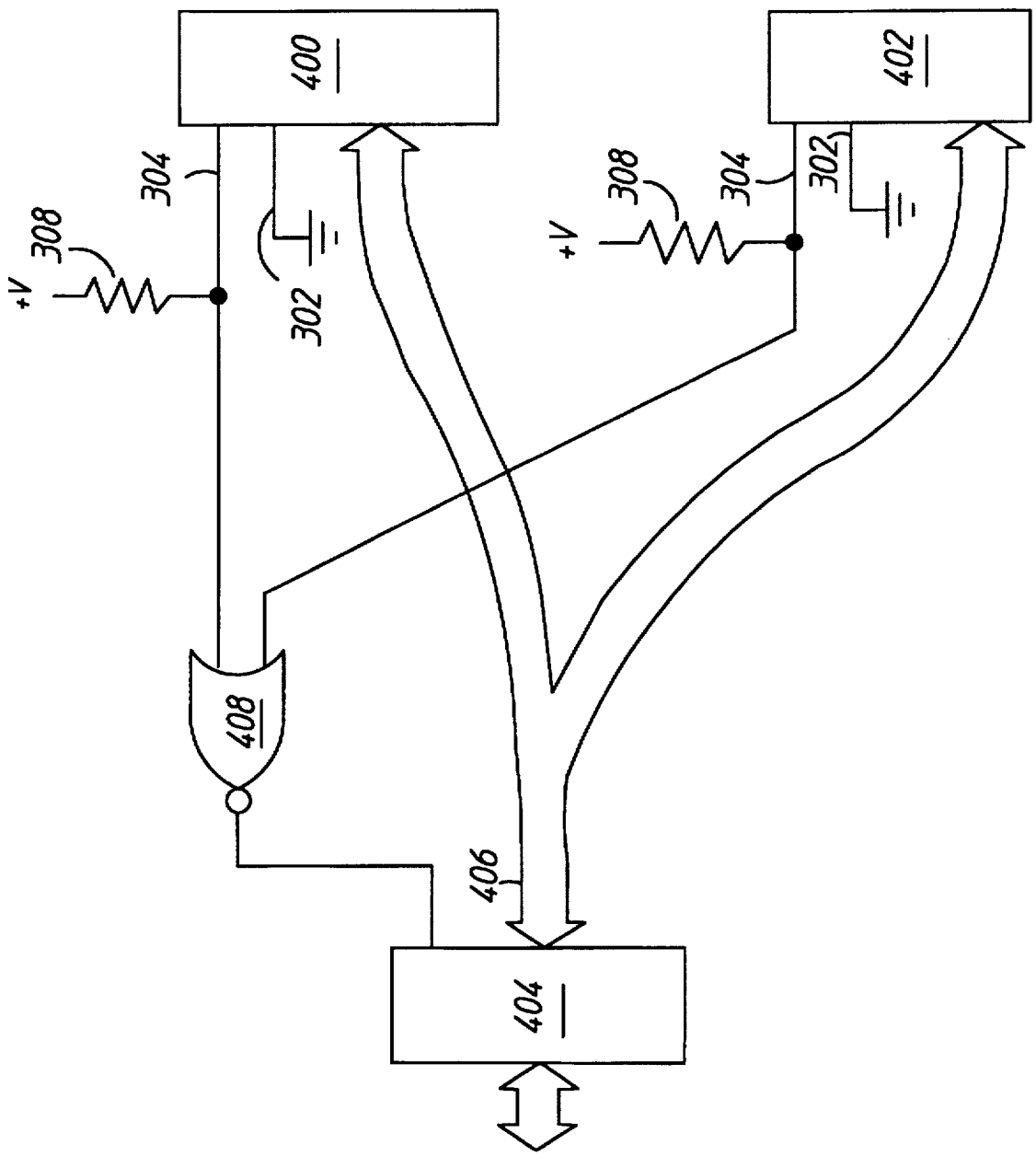
FIG. 4 is a block diagram schematic of the connector contact of figures 3A and 3B used in a SCSI bus system with an automatic active termination circuit.

FIG. 4 illustrates how the female contact and circuitry of FIGS. 3A and 3B are used to enable/disable an active termination circuit. Connectors 400 and 402 each contain at least one female contact as illustrated in FIGS. 3A and 3B. For each connector (400, 402), line 304 is pulled high if no mating connector is present and line 304 is pulled to ground through part 302 if a mating connector is present. A SCSI terminator 404 terminates the bidirectional data lines 406 for both connectors. SCSI terminator 404 may be a commercially available active terminator circuit such as part number UC5601DW manufactured by Unitrode Corporation or a functionally similar part. Alternatively, an electrically controlled switch may be used to switch a passive terminator circuit in or out. Terminator 404 has an enable/disable input control signal. Termination is enabled if the enable/disable signal is low. Logical NOR gate 408 provides a termination disable signal (high) if line 304 from both connectors (400, 402) is low (a mating connector is present for both connectors). Logical NOR gate 408 provides a termination enable signal (low) if line 304 from either connector (400, 402) is high (at least one connector is open). If only one connector (that is, 400 or 402 but not both) is present, an inverter may be used instead of gate 408 to control the enable/disable signal of the active terminator circuit.

As illustrated in FIG. 4, for SCSI applications, the special female connector contact enables detection of whether a male connector is installed. More importantly, it not only enables detection by one particular device if the one particular device is the only device on the bus with the special female connector, it also enables detection even if every device on the bus has the special female connector. Therefore, it can work with or without adoption as a standard. Note also that if one of the connectors in FIG. 4 is open and a termination plug is installed onto the open connector, the termination plug provides a male pin just as for a cable. Therefore, in FIG. 4, if there is a cable on one connector and a termination plug on the other connector, terminator 404 is automatically disabled and the external termination plug provides the termination. Finally, note that the male pin is grounded as required by the SCSI specification.

Note that in the SCSI application above, the female contact is specified as a ground connection. For other applications, the line at the contact could be specified as a non-zero voltage, with one part of the contact connected to the voltage and another part resistively connected to ground. Detection of the presence of a mating connector is then accomplished by detecting a voltage on the resistor to ground, or by detecting a current through the resistance. Alternatively, the two parts of the female contact can be used for any simple continuity measurement, the circuit being open if no mating connector is present and closed if a mating connector is present. The modified contact can also be a signal contact. One part is connected to the signal and another part is connected to a high impedance signal detection circuit. If a mating connector is present, a signal is detected at the signal detection circuit.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A connection indication system for an automatic termination system for a bus device comprising:

a device connector on the bus device;

a sense line;

a female contact in the device connector, the female contact further comprising a first part and a second part, the first part electrically isolated from the second part, the first part further electrically connected to the sense line and the second part electrically connected to a voltage potential; and the sense line electrically connected to the automatic termination system.

2. The connection indication system of claim 1 further comprising:

a male pin in a bus connector; and the sense line electrically connected to the voltage potential when the male pin in the bus connector electrically connects the first part of the female contact to the second part of the female contact.

3. A connection indication system for an automatic bus device termination system comprising:

a first and a second device connectors on the bus device;

a first and a second sense lines;

a first female contact in the first bus device connector;

a second female contact in the second bus device connector;

the first and second female contacts in the bus device connectors each further comprising a first part and a second part, the first part electrically isolated from the second part, the second part further electrically connected to a voltage potential, the first part of the first female contact further electrically connected to the first sense line, the first part of the second female contact further electrically connected to the second sense line; and the first and second sense lines electrically connected to the bus device termination system.

4. The connection indication system of claim 3 further comprising:

a male pin in a first bus connector; and the first sense line electrically connected to the voltage potential when the male pin in the first bus connector electrically connects the first part of the female contact to the second part of the female contact in the first bus device connector.

5. The connection indication system of claim 4 further comprising:

a male pin in a second bus connector; and the second sense line electrically connected to the voltage potential when the male pin in the second bus connector electrically connects the first part of the female contact to the second part of the female contact in the second bus device connector.

6. The connection indication system of claim 1 wherein the bus device is a SCSI device.

7. The connection indication system of claim 2 wherein the bus device is a SCSI device.

8. The connection indication system of claim 3 wherein the bus device is a SCSI device.

9. The connection indication system of claim 4 wherein the bus device is a SCSI device.

10. The connection indication system of claim 5 wherein the bus device is a SCSI device.

* * * * *